UNITED STATES PATENT OFFICE.

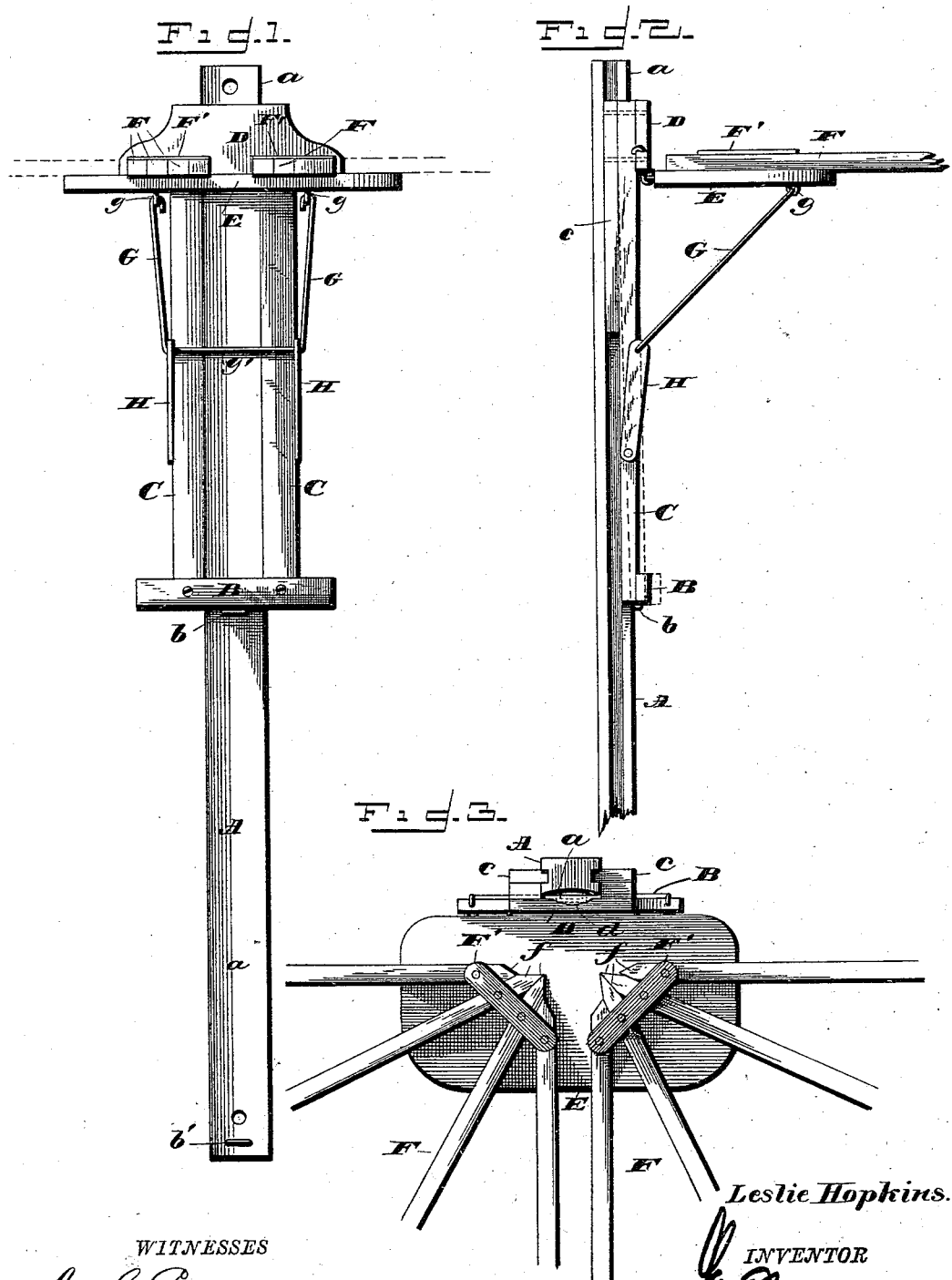

LESLIE HOPKINS, OF MILES GROVE, PENNSYLVANIA.

CLOTHES-DRIER.

SPECIFICATION forming part of Letters Patent No. 369,245, dated August 30, 1887.

Application filed March 19, 1887. Serial No. 231,590. (Model.)

*To all whom it may concern:*

Be it known that I, LESLIE HOPKINS, a citizen of the United States of America, residing at Miles Grove, in the county of Erie and State of Pennsylvania, have invented certain new and useful Improvements in Clothes-Driers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in clothes-driers, the object being to provide a device which can be attached to a wall or other support, and which can be readily raised and lowered, the parts being so constructed that they can be folded so as to occupy but a small vertical space, and the bars of which can be spread apart by simply swinging a single one upon its pivot, or closed by a similar movement.

With the above end in view my invention consists in the construction and combination of the parts, as will be hereinafter set forth, and as is shown in the accompanying drawings, in which—

Figure 1 is a front view of a clothes-drier constructed in accordance with my improvement. Fig. 2 is a side view, and Fig. 3 is a top view.

A refers to a suitable support, which may be attached in a vertical position to a wall. This support A is provided longitudinally with grooved sides, and the front side is made slightly concave, as shown at $a$. The concave side of the bar A is provided with stops $b$ and $b'$, upon which bears a suitable cross-bar, B, which is adapted to rest upon said stops, so as to hold the sliding frame in either a lowered or elevated position. To the cross-bar B are attached vertical strips C C, and to the upper rear portion of these strips are attached short pieces $c$ $c$, which engage with the grooved sides of the bar A.

The strips C C extend some distance below the point of attachment of pieces $c$ $c$, so that they may be sprung outward to carry the cross-bar B free from the stop $b$, as indicated by dotted lines, Fig. 2.

D refers to a cross-piece, which is suitably recessed, as shown at $d$, on its under side, so as to permit the same passing over the stop $b$, and to this cross-piece D is hinged or otherwise suitably secured a platform, E, to which the bars F are secured, as will be hereinafter set forth.

To the under side of the platform E are attached loops or staples $g$, with which the bent ends of the bail G engage, said bail having a horizontal portion, $g'$, which passes through eyes formed in the end of the pivoted links H H, which are secured to the side pieces or vertical strips, C. By thus connecting the platform to the sliding frame the same may be folded so as to be placed in a vertical position, or the same may be thrown upward and held in a horizontal position by the bail and links, as shown in full lines in the accompanying drawings.

The bars F, hereinbefore referred to, are provided at their ends adjacent to the sliding frame with beveled ends $f$, and these bars are pivotally secured to the platform by pins or bolts which pass through plates F'. By beveling the ends of the bars F, by simply moving the one nearest the outer side of the frame and swinging it toward the wall, each of the other bars will be moved to its proper position, and these beveled ends also serve to hold the bars and brace them when placed in position.

When it is desired to elevate the drier upon the bar A, the sliding frame is moved upwardly, and by grasping the cross-bar B and drawing it outwardly it may, owing to the spring of the side strips, C C, be moved over the stop $b$, which will hold the frame in a raised position. The bars F may be then elevated, if they have not been elevated before, the frame is raised, and the bars are swung outwardly, as hereinbefore described. Usually, the platform is brought to a horizontal position and the bars swung outwardly, so as to receive the articles to be placed thereon before the frame is elevated, as then the articles to be dried can be readily placed on the bars, and they can be raised to near the ceiling of the room, so as to be out of the way.

I claim—

1. The combination, substantially as described, of a supporting-bar, a frame mounted to slide thereon, a platform hinged to the frame and provided with bars F, a bail hinged to the platform, and links pivotally connected at one end to the bail and at the other end to the sides of the sliding frame.

2. The combination, with a clothes-drier, of the bar A, provided with grooved sides and stops $b$ and $b'$, of a sliding frame carrying suitable bars, F, said sliding frame being provided near its upper end with strips $c$, which engage with grooves and permit the lower end of the sliding frame to be sprung outwardly over the stops, substantially as shown, and for the purpose specified.

3. In a clothes-drier, the combination, with the bar A, having grooved sides and a concave front edge, of the stops $b$ and $b'$, attached to the front side thereof, a sliding frame consisting of longitudinal bars C, connected to each other at their upper and lower ends by cross-bars, short strips $c$ $c$, attached to the upper end of the longitudinal bars C, the cross-bar D, being recessed, for the purpose specified, and a platform hinged to the cross-bar D, and adapted to be supported in a horizontal position by the means shown, and bars F, pivoted to said platform, the parts being organized substantially as shown, and for the purpose set forth.

In testimony whereof I affix my signature in presence of two witnesses.

LESLIE HOPKINS.

Witnesses:
M. STEARNS,
CALVIN J. HINES.